US012807305B2

(12) United States Patent
Romana

(10) Patent No.: US 12,807,305 B2
(45) Date of Patent: Nov. 24, 2026

(54) CONTROL SYSTEM FOR CONTROLLING A LANDING GEAR DRIVE SYSTEM

(71) Applicant: AIRBUS OPERATIONS (S.A.S.), Toulouse (FR)

(72) Inventor: Louis Emmanuel Romana, Bristol (GB)

(73) Assignee: AIRBUS OPERATIONS (S.A.S.), Toulouse (FR)

(*) Notice: Subject to any disclaimer, the term of this patent is extended or adjusted under 35 U.S.C. 154(b) by 16 days.

(21) Appl. No.: 19/000,154

(22) Filed: Dec. 23, 2024

(65) Prior Publication Data

US 2026/0116531 A1 Apr. 30, 2026

Related U.S. Application Data

(62) Division of application No. 17/108,449, filed on Dec. 1, 2020, now abandoned.

(30) Foreign Application Priority Data

Dec. 2, 2019 (GB) ..................................... 1917559

(51) Int. Cl.
*B64C 25/28* (2006.01)
*B60L 7/10* (2006.01)
(Continued)

(52) U.S. Cl.
CPC ................ *B64C 25/28* (2013.01); *B60L 7/10* (2013.01); *B64C 25/405* (2013.01); *G05D 17/02* (2013.01); *G08G 5/51* (2025.01); *B60L 2200/10* (2013.01)

(58) Field of Classification Search
CPC ......... B64C 25/28; B64C 25/405; B60L 7/10; B60L 2200/10; G05D 17/02; G08G 5/51
See application file for complete search history.

(56) References Cited

U.S. PATENT DOCUMENTS 9,630,708 B2 4/2017 Lo et al.
9,676,475 B2 6/2017 Goldman et al.
(Continued)

FOREIGN PATENT DOCUMENTS

EP 3 243 746 A1 11/2017
FR 3 089 493 6/2020
GB 2 528 966 A 2/2016

OTHER PUBLICATIONS

Combined Search and Examination Report for GB1917559.5 dated Aug. 14, 2020, 15 pages.
(Continued)

*Primary Examiner* — Kyle J Kingsland
(74) *Attorney, Agent, or Firm* — Nixon & Vanderhye, PC

(57) ABSTRACT

A control system for controlling a landing gear drive system for driving rotation of an aircraft wheel is disclosed having a control panel with a controller having a forward motion setting and a zero speed setting, a control unit for receiving a control input from the controller, and for providing a torque command to be applied to the wheel, and a speed sensor for sensing an aircraft taxi speed and for providing an indication of the aircraft taxi speed to the control unit. When the controller is moved from the forward motion setting to the zero speed setting, the control unit provides a torque command to the drive system to provide zero forwards driving torque to the wheel, and a braking command to apply a braking torque to the wheel.

17 Claims, 3 Drawing Sheets

(51) Int. Cl.

| | |
|---|---|
| ***B64C 25/32*** | (2006.01) |
| ***G05D 17/02*** | (2006.01) |
| ***G08G 5/51*** | (2025.01) |

(56) References Cited

U.S. PATENT DOCUMENTS

| | | | |
|---|---|---|---|
| 2013/0087654 | A1 | 4/2013 | Seibt |
| 2015/0204397 | A1 | 7/2015 | Edelson |
| 2015/0225075 | A1 | 8/2015 | Renier et al. |
| 2016/0012736 | A1 | 1/2016 | Nutaro et al. |
| 2016/0041555 | A1 | 2/2016 | Bayer |
| 2016/0176517 | A1 | 6/2016 | Cox et al. |
| 2016/0200428 | A1 | 7/2016 | Morris et al. |
| 2017/0057624 | A1* | 3/2017 | Lo ........................... F16D 57/06 |
| 2018/0122250 | A1 | 5/2018 | Wapenski et al. |
| 2020/0180753 | A1 | 6/2020 | Boissard |
| 2021/0104164 | A1 | 4/2021 | Erignac |
| 2021/0163123 | A1 | 6/2021 | Romana |

OTHER PUBLICATIONS

Extended European Search Report for European Application No. 20306475.3, 11 pages, dated Apr. 15, 2021.

* cited by examiner

CONTROL SYSTEM FOR CONTROLLING A LANDING GEAR DRIVE SYSTEM

CROSS RELATED APPLICATIONS

This application is a Divisional application of U.S. patent application Ser. No. 17/108,449, filed Dec. 1, 2020, pending, which claims priority to United Kingdom Patent Application GB 1917559.5, filed Dec. 2, 2019, the entire contents of which are hereby incorporated by reference.

BACKGROUND OF THE INVENTION

The present disclosure relates to control systems for controlling a landing gear drive system of an aircraft.

The present invention concerns a control system. More particularly, but not exclusively, this invention concerns a control system for controlling a landing gear drive system on an aircraft, the drive system being capable of driving rotation of a wheel of the aircraft, the control system comprising a control panel, provided with a controller, a control unit for receiving a control input from the controller, and for providing a torque command to be applied to the wheel, and a speed sensor for sensing an aircraft taxi speed and for providing an indication of the aircraft taxi speed to the control unit.

The invention also concerns other control systems, an aircraft, methods of controlling an aircraft landing gear drive system and a control panel.

US 2015/0225075 describes a control system for an aircraft landing gear drive system. FIG. 1 is a representation of a controller 10 of such a system. The controller 10 has three different settings; a backwards speed setting 11, a zero setting 12 and a forward speed setting 13. When in the forward speed setting 13, the system provides an amount of torque to the drive system based on the position of a controller within the forward speed setting. In other words, the controller dictates how much torque is provided. However, even in a maximum forwards setting 14, this may not be sufficient to maintain a forwards motion of the aircraft. For example if the aircraft is going up hill, a low forwards driving torque level may not provide a forwards motion.

In the backwards speed setting 11, the amount of backwards driving torque supplied is based on the speed of the aircraft, such that the speed is maintained to be at or near 2 knots (backwards). When the controller is moved from the backwards speed setting to the zero setting 12 (arrow 15), the torque supplied is adjusted, and brakes applied, so as to slow the aircraft down to, and then maintain, zero speed. The park brake of the aircraft can then be applied.

When the controller is moved from the forwards speed setting 13 to the zero setting 12 (arrow 16), the forwards driving torque supplied is reduced to zero. However, this does not necessarily result in the aircraft slowing down to and maintaining zero speed (for example, if it was on a slope). Hence, it has been realised that the zero setting has two different ways of operating depending on where the controller has been moved from to get to that setting. Hence, a pilot may not be clear on whether or not the aircraft will be slow to and/or hold zero speed in the zero setting.

It is also difficult to control the speed of the aircraft when moving forwards at a low speed. This makes parking the aircraft (nose in) at an aircraft gate very difficult and may lead to damage if a low speed impact occurs between an aircraft and an aircraft gate.

In addition, there is no way of ensuring that the aircraft can move effectively (i.e. quick enough) up a hill or across a runway, if needed, without providing an oversized drive system.

The present invention seeks to mitigate the above-mentioned problems. Alternatively or additionally, the present invention seeks to provide an improved control system.

SUMMARY OF THE INVENTION

The present invention provides, according to a first aspect, a control system for controlling a landing gear drive system on an aircraft, the drive system being capable of driving rotation of a wheel of the aircraft, the control system comprising a control panel, provided with a controller, the controller having at least two settings; a forward motion setting, and a zero speed setting, a control unit for receiving a control input from the controller, and for providing a torque command to be applied to the wheel, and a speed sensor for sensing an aircraft taxi speed and for providing an indication of the aircraft taxi speed to the control unit, wherein the control unit is arranged such that, when the controller is moved from the forward motion setting to the zero speed setting, the control unit provides a torque command to the drive system to provide zero forwards driving torque to the wheel, and the control unit provides a braking command to apply a braking torque to the wheel to slow rotation of the wheel while the aircraft taxi speed is above zero.

Preferably, the control unit (only) provides the braking command when the aircraft taxi speed is below a lowness threshold, such as 1-3, more preferably 2 knots. For example, above this speed, the aircraft may only decelerate naturally, or due to manual brakes being applied.

The braking command may continue to be provided (and applied) even after the aircraft taxi speed has reduced to zero. For example, friction brakes may still be commanded to be applied.

The control panel may be for location in a cockpit of the aircraft.

Such a system allows a pilot, or other user, to control the aircraft speed from a forwards speed to zero speed. This is done in a controlled manner, avoiding any jerkiness or sudden braking. Without the active control (by the control system) of the reduction in aircraft speed, the pilot themselves would have to use the aircraft brakes (through the brake pedals) to control the stopping of the aircraft. This could lead to jerkiness and sudden braking and could be uncomfortable for passengers. In addition, such a system effectively provides an additional parking brake functionality.

The drive system may comprise a pinion gear, driveable by a motor, and a driven gear attached to the wheel, the pinion gear being engageable with the driven gear to drive rotation of the driven gear, and wherein the torque command to provide zero forwards driving torque to the wheel includes a command to disengage the pinion gear and driven gear.

This ensures that no driving torque (or in fact any significant torque) is provided to or applied to the wheel by the drive system.

The command to disengage the pinion gear and driven gear may be given when the indication of the aircraft taxi speed is above a predetermined highness threshold. This may be done to prevent jamming of the pinion gear and driven gear. For example, this may be at a forward speed of 30 knots or higher. 1 knot is approximately equal to 0.514 m/s.

This may be a useful way of providing zero driving torque at a high speed, where there is significant energy involved and where leaving the drive system engaged may cause significant regenerative braking and excessive heat generation that may not easily be able to be dissipated, and damage.

Preferably, the drive system comprises a pinion gear driveable by a motor, the pinion gear being arrangeable to drive rotation of the wheel, and wherein the torque command to provide zero forwards driving torque to the wheel includes a command to reduce the driving torque provided by the motor to the pinion gear to zero.

More preferably, the command to reduce the driving torque provided by the motor to the pinion gear to zero is given when the indication of the aircraft taxi speed is below a predetermined lowness threshold.

For example, this may be at a forward speed of 30 knots or lower.

This may be a useful way of providing zero driving torque at a low speed, where there is less energy involved and where leaving the drive system engaged does not cause significant regenerative braking and therefore no excessive heat generation. There is also less risk of jamming. Of course, regenerative braking will act to slow rotation of the wheel.

The highness threshold may be the same as the lowness threshold. In other words, at that speed threshold the command changes.

Preferably, the braking command to apply a braking torque to the wheel to slow rotation of the wheel includes a command to a braking system of the aircraft to apply a braking torque to the wheel.

For example, the braking system may be a friction braking system.

The control system may also control brakes, for example friction brakes, of the wheel or aircraft. The brakes may be controlled directly from the control system or may be controlled by the drive system. For example, the drive system may receive the braking command from the control unit and then provide a braking command to the brakes.

More preferably, the command to the braking system of the aircraft is given when the indication of the aircraft taxi speed is low.

For example, at a forward speed of 1 knot or lower.

This may be a useful way of providing a braking torque at a low speed, where the aircraft needs to be stopped.

Preferably, the braking command to apply a braking torque to the wheel to slow rotation of the wheel includes a command to the drive system of the aircraft to apply a braking torque to the wheel.

More preferably, the drive system is commanded to provide a regenerative braking torque.

This may be provided by having the pinion gear and driven gear engaged with each other, or the pinion gear, and therefore the motor, otherwise engaged with the wheel. Here, the motor being connected to the wheel, and bring driven backwards by the wheel, causes a regenerative braking effect on the wheel.

Preferably, the command to the drive system of the aircraft is given when the indication of the aircraft taxi speed is low.

For example, at a forward speed of 1-3 knots or lower, preferably at 2 knots or lower.

This may be a useful way of providing a braking torque at a low speed, where there is less energy involved and where regenerative braking would not cause excessive heat generation.

According to a second aspect of the invention there is also provided a control system for controlling a landing gear drive system on an aircraft, the drive system being capable of driving rotation of a wheel of the aircraft, the control system comprising a control panel, provided with a controller, the controller having at least two forward motion settings; a low forward speed setting, and a high forward speed setting, a control unit for receiving a control input from the controller, and for providing a torque command to be applied to the wheel, and a speed sensor for sensing an aircraft taxi speed and for providing an indication of the aircraft taxi speed to the control unit, wherein the control unit is arranged such that, when the controller is in the low forward speed setting, the control unit provides a torque command to the drive system, based on the indication of the aircraft taxi speed, to maintain the aircraft taxi speed at or near a desired speed.

The control panel may be for location in a cockpit of the aircraft.

The aircraft speed may be maintained within a small range around a desired speed level, for example, the speed may be maintained with 0.1 knots of a desired speed. Hence, if the aircraft speed is indicated as being higher than the desired speed, the torque command provided is reduced and if the aircraft speed is indicated as slower than the desired speed, the torque command provided is increased. The desired speed may be 2 knots. This allows the speed of the aircraft to be controlled, without active control by the pilot, or user. Hence, the taxiing is likely to be much smoother, as there would be no need for the pilot to use the brake pedals, for example.

Alternatively, or additionally, regenerative braking may be used to maintain the aircraft speed within the small range. For example, if the aircraft speed is indicated as being higher than the desired speed, the regenerative braking is increased, and if the aircraft speed is indicated as slower than the desired speed, the regenerative braking is decreased.

The high forward speed setting may comprise a range of sub-settings, for example, determined by the positioning of the controller within the high speed setting.

Preferably, the desired speed is within the range between 1 and 3 knots, preferably 1.5 to 2.5 knots and more preferably 1.75 to 2.25 knots.

This is approximately walking speed and allows someone to walk along with the aircraft during taxiing.

Preferably, the control unit is arranged such that, when the controller is in the high forward speed setting, the control unit provides a torque command to the drive system, based on a positioning of the controller within the high speed setting.

For example, if the controller is positioned at a lower end of the high speed setting, the torque command would be low. The torque command would still be higher than that of the low speed setting. In other words, in the high speed setting, the speed of the aircraft (for the same ground slope angle and/or conditions) is higher than the desired speed of the low speed setting. For example, if the controller is positioned at a higher end of the high speed setting, the torque command would be high.

In other words, in the high speed setting, the torque commanded is as a function of an indication of relative power level desired. It is not related to a function of the aircraft speed.

Preferably, the controller has a zero speed setting, and wherein the control unit is arranged such that, when the controller is moved from a forward motion setting to the zero speed setting the control unit provides a torque command to the drive system to provide zero forwards driving torque to the wheel, and the control unit provides a braking command to apply a braking torque to the wheel to slow rotation of the wheel while the aircraft taxi speed is above zero.

In other words, the control system of the second aspect may include the zero speed setting of the first aspect of the invention and any of the dependent features of this aspect.

According to a third aspect of the invention there is also provided a control system for controlling a landing gear drive system on an aircraft, the drive system being capable of driving rotation of a wheel of the aircraft, the control system comprising a control panel, provided with a controller, the controller having at least two power settings; a normal power setting, and a boost power setting, and a control unit for receiving a control input from the controller, and for providing a torque command to be applied to the wheel, wherein the control unit is arranged such that, when the controller is in the normal power setting, the control unit provides a torque command to the drive system to provide a driving torque to the wheel up to a first power level, and wherein the control unit is arranged such that, when the controller is in the boost power setting, the control unit provides a torque command to the drive system to provide a driving torque to the wheel at a second power level, higher than the first power level, and wherein the controller is biased away from the boost power setting and towards the normal power setting.

The control panel may be for location in a cockpit of the aircraft.

Such a system allows a pilot, or other user, to be able to hold the controller in the boost power setting to provide an additional power (torque) level to the drive system. This may be useful for crossing a runway or for taxiing the aircraft uphill. The controller needs to actively be held in the boost setting, against the biasing.

The biasing may be provided by a spring, for example.

Preferably, the second power level is 10% to 25% higher, more preferably between 15% and 20% higher, than the first power level. For example, the first power level may go up to 55 kVA and the second power level may be 65 kVA (18% higher).

Preferably, the control unit is arranged to reduce the torque command to the first power level, if the controller is in the boost power setting and if an indication of the additional power provided to the drive system in the boost power setting has reached a set limit.

For example, this set limit could be a time period that the controller has been in the boost setting. For example, it may be 30 seconds or 1 minute.

For example, this set limit may be an amount of additional power, over time, has been provided in the boost power setting.

The control unit may also be arranged such that no additional power is provided, even when in the boost setting, until a period of time has passed since providing additional power. That time period may be 30 seconds or 1 minute, for example.

The control unit may alternatively be arranged such that no additional power is provided, even when in the boost setting, until a reduction in power provided, over time, has been provided in the normal power setting. For example, this may be equivalent to the controller being at a maximum position within the normal power setting for 1 minute. It may be equivalent to the controller being at a 90% position within the normal power setting for 30 seconds.

Preferably, the additional power in the boost power setting is provided by the same power source that supplies the power of the normal power setting.

This may be from an APU (Auxiliary Power Unit) or a battery, for example.

Alternatively, the additional power in the boost power setting is provided by a different power source that that which supplies the power of the normal power setting.

For example, the power supplied in the normal power setting may be supplied from a battery and the additional power supplied in the boost power setting may be supplied by the APU (or vice versa).

Preferably, both of the power settings are forward motion settings.

More preferably, the normal power setting has two sub-settings; a low forward speed setting, and a high forward speed setting, wherein the control system further comprises a speed sensor for sensing an aircraft taxi speed and for providing an indication of the aircraft taxi speed to the control unit, and wherein the control unit is arranged such that, when the controller is in the low forward speed setting, the control unit provides a torque command to the drive system, based on the indication of the aircraft taxi speed, to maintain the aircraft taxi speed at or near a desired speed.

In other words, the control system of the third aspect may include the two forward speed settings of the second aspect of the invention and any of the dependent features of this aspect.

Preferably, the controller has a zero speed setting, and wherein the control unit is arranged such that, when the controller is moved from a forward motion setting to the zero speed setting the control unit provides a torque command to the drive system to provide zero forwards driving torque to the wheel, and the control unit provides a braking command to apply a braking torque to the wheel to slow rotation of the wheel while the aircraft taxi speed is above zero.

In other words, the control system of the third aspect may include the zero speed setting of the first aspect of the invention and any of the dependent features of this aspect.

According to a fourth aspect of the invention there is also provided a control system for controlling a landing gear drive system on an aircraft, the drive system being capable of driving rotation of a wheel of the aircraft, the control system comprising a control panel, provided with a controller, the controller having a backwards motion setting, a control unit for receiving a control input from the controller, and for providing a torque command to be applied to the wheel, and a speed sensor for sensing an aircraft taxi speed and for providing an indication of the aircraft taxi speed to the control unit, wherein the control unit is arranged such that, when the controller is in the backwards motion setting, the control unit provides a backwards driving torque command to the drive system, based on the indication of the aircraft taxi speed, to maintain the backwards aircraft taxi speed at or near a desired speed.

The control panel may be for location in a cockpit of the aircraft.

The aircraft speed may be maintained within a small range around a desired speed level, for example, the speed may be maintained with 0.1 knots of a desired speed. Hence, if the aircraft speed is indicated as being higher than the desired speed, the torque command provided is reduced and if the aircraft speed is indicated a slower than the desired speed, the torque command provided is increased. The desired speed may be 2 knots.

This allows the backwards speed of the aircraft to be controlled, without active control by the pilot, or user. Hence, the taxiing is likely to be much smoother, as there would be no need for the pilot to use the brake pedals, for example.

Alternatively, or additionally, regenerative braking may be used to maintain the aircraft speed within the small range. For example, if the aircraft speed is indicated as being higher than the desired speed, the regenerative braking is increased, and if the aircraft speed is indicated as slower than the desired speed, the regenerative braking is decreased.

Preferably, the desired speed is within the range between 1 and 3 knots, preferably 1.5 to 2.5 knots and more preferably 1.75 to 2.25 knots.

This is approximately walking speed and allows someone to walk along with the aircraft during taxiing.

Preferably, the controller has a zero speed setting, and wherein the control unit is arranged such that, when the controller is moved from a forward motion setting to the zero speed setting the control unit provides a torque command to the drive system to provide zero forwards driving torque to the wheel, and the control unit provides a braking command to apply a braking torque to the wheel to slow rotation of the wheel while the aircraft taxi speed is above zero.

In other words, the control system of the fourth aspect may include the zero speed setting of the first aspect of the invention and any of the dependent features of this aspect.

Preferably, the controller has at least two forward motion settings; a low forward speed setting, and a high forward speed setting, and wherein the control unit is arranged such that, when the controller is in the low forward speed setting, the control unit provides a torque command to the drive system, based on the indication of the aircraft taxi speed, to maintain the aircraft taxi speed at or near a desired speed.

In other words, the control system of the fourth aspect may include the two forward speed settings of the second aspect of the invention and any of the dependent features of this aspect.

Preferably, the controller has at least two power settings; a normal power setting, and a boost power setting, wherein the control unit is arranged such that, when the controller is in the normal power setting, the control unit provides a torque command to the drive system to provide a driving torque to the wheel up to a first power level, and wherein the control unit is arranged such that, when the controller is in the boost power setting, the control unit provides a torque command to the drive system to provide a driving torque to the wheel at a second power level, higher than the first power level, and wherein the controller is biased away from the boost power setting and towards the normal power setting.

In other words, the control system of the fourth aspect may include the boost power setting of the third aspect of the invention and any of the dependent features of this aspect.

The normal power setting may include the two forward motion settings of the second aspect.

According to a fifth aspect of the invention there is also provided a control system for controlling a landing gear drive system on an aircraft, the drive system being capable of driving rotation of a wheel of the aircraft, the control system comprising a control panel, provided with a controller, the controller having at least two settings; a backwards motion setting, and a zero speed setting, a control unit for receiving a control input from the controller, and for providing a torque command to be applied to the wheel, and a speed sensor for sensing an aircraft taxi speed and for providing an indication of the aircraft taxi speed to the control unit, wherein the control unit is arranged such that, when the controller is moved from the backwards motion setting to the zero speed setting the control unit provides a torque command to the drive system to provide zero backwards driving torque to the wheel, and the control unit provides a braking command to apply a braking torque to the wheel to slow rotation of the wheel while the aircraft taxi speed is above zero.

The braking command may continue to be provided (and applied) even after the aircraft taxi speed has reduced to zero. For example, friction brakes may still be commanded to be applied. Such a system may effectively provide an additional parking brake functionality.

The control panel may be for location in a cockpit of the aircraft.

Preferably, the drive system comprises a pinion gear, driveable by a motor, the pinion gear being arrangeable to drive rotation of the wheel, and wherein the torque command to provide zero backwards driving torque to the wheel includes a command to reduce the backwards driving torque provided by the motor to the pinion gear to zero.

Preferably, the braking command to apply a braking torque to the wheel to slow rotation of the wheel includes a command to a braking system of the aircraft to apply a braking torque to the wheel.

For example, the braking system may be a friction braking system.

The control system may also control brakes, for example friction brakes, of the wheel or aircraft. The brakes may be controlled directly from the control system or may be controlled by the drive system. For example, the drive system may receive the braking command from the control unit and then provide a braking command to the brakes.

Preferably, the braking command to apply a braking torque to the wheel to slow rotation of the wheel includes a command to the drive system of the aircraft to apply a braking torque to the wheel.

More preferably, the braking command includes a command to the drive system to provide a regenerative braking torque.

This may be provided by having the pinion gear and driven gear engaged with each other, or the pinion gear, and therefore the motor, otherwise engaged with the wheel. Here, the motor being connected to the wheel, and being driven backwards by the wheel, causes a regenerative braking effect on the wheel.

Preferably, the controller has a zero speed setting, and wherein the control unit is arranged such that, when the controller is moved from a forward motion setting to the zero speed setting the control unit provides a torque command to the drive system to provide zero forwards driving torque to the wheel, and the control unit provides a braking command to apply a braking torque to the wheel to slow rotation of the wheel while the aircraft taxi speed is above zero.

In other words, the control system of the fifth aspect may include the zero speed setting of the first aspect of the invention and any of the dependent features of this aspect.

Preferably, the controller has at least two forward motion settings a low forward speed setting, and a high forward speed setting, and wherein the control unit is arranged such that, when the controller is in the low forward speed setting, the control unit provides a torque command to the drive system, based on the indication of the aircraft taxi speed, to maintain the aircraft taxi speed at or near a desired speed.

In other words, the control system of the fifth aspect may include the two forward speed settings of the second aspect of the invention and any of the dependent features of this aspect.

Preferably, the controller has at least two power settings a normal power setting, and a boost power setting, wherein the control unit is arranged such that, when the controller is in the normal power setting, the control unit provides a torque command to the drive system to provide a driving torque to the wheel up to a first power level, and wherein the control unit is arranged such that, when the controller is in the boost power setting, the control unit provides a torque command to the drive system to provide a driving torque to the wheel at a second power level, higher than the first power level, and wherein the controller is biased away from the boost power setting and towards the normal power setting.

In other words, the control system of the fifth aspect may include the boost power setting of the third aspect of the invention and any of the dependent features of this aspect.

The normal power setting may include the two forward motion settings of the second aspect.

Preferably, the controller has a backwards motion setting, and wherein the control unit is arranged such that, when the controller is in the backwards motion setting, the control unit provides a backwards driving torque command to the drive system, based on the indication of the aircraft taxi speed, to maintain the backwards aircraft taxi speed at or near a desired speed.

In other words, the control system of the fifth aspect may include the backwards motion setting of the fourth aspect of the invention and any of the dependent features of this aspect.

According to a sixth aspect of the invention there is also provided an aircraft comprising an aircraft landing gear, having at least one wheel provided with a drive system for driving rotation of the wheel, the drive system comprising a motor, wherein the aircraft also comprises the control system as described above, or control panel as described below, the control system or control panel being arranged to control the drive system.

According to a seventh aspect of the invention there is also provided a method of controlling an aircraft landing gear drive system capable of driving rotation of a wheel of an aircraft, the method comprising the step of using a control system or aircraft as described above or control panel as described below.

According to an eighth aspect of the invention there is also provided a method of controlling an aircraft landing gear drive system capable of driving rotation of a wheel of an aircraft, the method comprising the steps of moving a controller of a control panel from a forward motion setting to a zero speed setting, and providing such a control input from the controller to a control unit, and, when the controller is in the zero speed setting, the control unit providing a torque command to the drive system to provide zero forwards driving torque to the wheel, and the control unit providing a braking command to apply a braking torque to the wheel to slow rotation of the wheel while the aircraft taxi speed is above zero.

According to a ninth aspect of the invention there is also provided a method of controlling an aircraft landing gear drive system capable of driving rotation of a wheel of an aircraft, the method comprising the steps of positioning a controller of a control panel in a low forward speed setting and providing such a control input from the controller to a control unit, when the controller is in the low forward speed setting, the control unit providing a torque command to the drive system, based on an indication of an aircraft taxi speed such that the aircraft taxi speed is maintained at or near a desired speed, and positioning the controller of the control panel in a high forward speed setting and providing such a control input from the controller to a control unit.

According to a tenth aspect of the invention there is also provided a method of controlling an aircraft landing gear drive system capable of driving rotation of a wheel of an aircraft, the method comprising the steps of positioning a controller of a control panel in a normal power setting and providing such a control input from the controller to a control unit, when the controller is in the normal power setting, the control unit providing a torque command to the drive system to provide a driving torque to the wheel up to a first power level, positioning a controller of a control panel in a boost power setting by urging the controller against a biasing force that biases the controller away from the boost power setting and towards the normal power setting, and providing such a control input from the controller to a control unit, and when the controller is in the boost power setting, the control unit providing a torque command to the drive system to provide a driving torque to the wheel at a second power level, higher than the first power level.

According to an eleventh aspect of the invention there is also provided a method of controlling an aircraft landing gear drive system capable of driving rotation of a wheel of an aircraft, the method comprising the steps of positioning a controller of a control panel in a backwards motion setting, and providing such a control input from the controller to a control unit, and when the controller is in the backwards motion setting, the control unit providing a backwards driving torque command to the drive system, based on an indication of an aircraft taxi speed such that the backwards aircraft taxi speed is maintained at or near a desired speed.

According to a twelfth aspect of the invention there is also provided a method of controlling an aircraft landing gear drive system capable of driving rotation of a wheel of an aircraft, the method comprising the steps of moving a controller of a control panel from a backwards motion setting to a zero speed setting, and providing such a control input from the controller to a control unit, and, when the controller is in the zero speed setting, the control unit providing a torque command to the drive system to provide zero backwards driving torque to the wheel, and the control unit providing a braking command to apply a braking torque to the wheel to slow rotation of the wheel while the aircraft taxi speed is above zero.

According to a thirteenth aspect of the invention there is provided a control panel of an aircraft, the control panel provided with a controller in the form of a rotary dial and having a forward motion setting for controlling forwards driving rotation of a wheel of the aircraft, wherein the forward motion setting is located at least partially between 9 o'clock and 12 o'clock on the rotary dial.

The "o'clock" positions are defined in relation to normal hour positions of a clock in a normal orientation, as viewed by a pilot. In other words, the 9 o'clock position is located at 270 degrees clockwise from a 0 degrees bearing (12 o'clock).

This allows for forwards facing positions of the rotary dial (i.e. between 9 o'clock and 3 o'clock) to relate to commanded forwards movement of the aircraft. In addition, for most scenarios, commanding a higher forwards speed involves moving the dial further forwards. This makes the controller more intuitive and easier to use.

Preferably, the forward motion setting is located substantially between 9 o'clock and 12 o'clock on the rotary dial.

In other words, if the forward motion setting is a region of the rotary dial, most of the forwards motion setting region is located between 9 o'clock and 12 o'clock on the rotary dial.

Preferably, the forwards motion setting comprises a low forward speed setting, for maintaining aircraft taxi speed at or near a desired low speed, and a high forward speed setting, wherein the high forward speed setting is located substantially between 9 o'clock and 12 o'clock on the rotary dial.

More preferably, the low forward speed setting is located (substantially) at 9 o'clock on the rotary dial.

Preferably, the controller has a zero speed setting, for commanding zero driving torque to the wheel of the aircraft, wherein the zero speed setting is located anti-clockwise from 9 o'clock on the rotary dial.

The zero speed setting may be between 6 o'clock and 9 o'clock on the rotary dial. Hence, this is within an expected rotation range of a pilot hand, so that a pilot is able to move to/from the zero speed setting without having to lift their hand off the controller.

More preferably, the zero speed setting is located between 8 o'clock and 9 o'clock on the rotary dial.

Preferably, the controller has a backwards motion setting, for controlling backwards driving rotation of a wheel of the aircraft, wherein the backwards motion setting is located anti-clockwise from 9 o'clock on the rotary dial.

The backwards motion setting may be between 6 o'clock and 9 o'clock on the rotary dial. Hence, this is within an expected rotation range of a pilot hand, so that a pilot is able to move to/from the backwards motion setting without having to lift their hand off the controller.

More preferably, the backwards motion setting is located between 7 o'clock and 8 o'clock on the rotary dial.

Preferably, the forwards motion setting comprises a normal power setting, for providing a torque command up to a first power level, and a boost power setting, for providing a torque command at a second power level, higher than the first power level, wherein the normal power setting is located substantially between 9 o'clock and 12 o'clock on the rotary dial.

The normal power setting may encompass the low and/or the high forwards speed settings.

More preferably, the controller is biased away from the boost power setting and towards the normal power setting.

Preferably, a maximum normal power setting is located substantially at 12 o'clock on the rotary dial.

Preferably, the boost power setting is located clockwise from 12 o'clock on the rotary dial.

The boost power setting may be between 12 o'clock and 3 o'clock on the rotary dial. Hence, this is within an expected rotation range of a pilot hand, so that a pilot is able to move to/from the boost power setting without having to lift their hand off the controller.

More preferably, the boost power setting is located between 12 o'clock and 1 o'clock on the rotary dial.

The control panel of the thirteenth aspect may be part of a control system of any of the other aspects of the invention.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
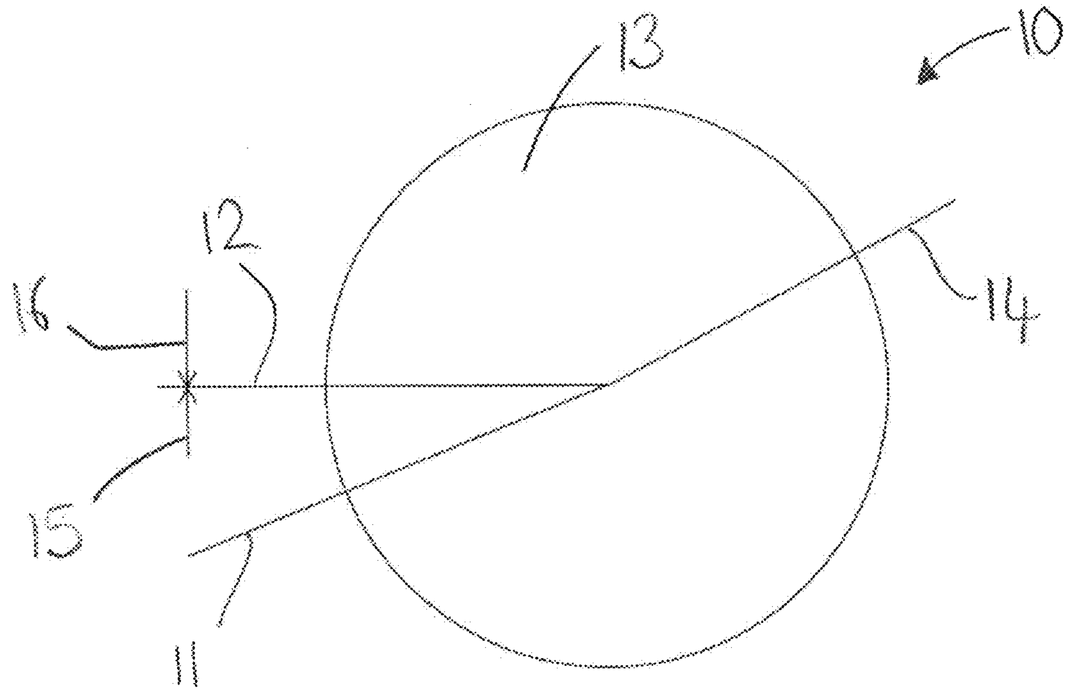
Fig. 1 (Prior Art)
FIG. 1 shows a front schematic view of an example controller.

FIG. 1 shows a front schematic view of an example controller 10, as described above.

Figure 2A:
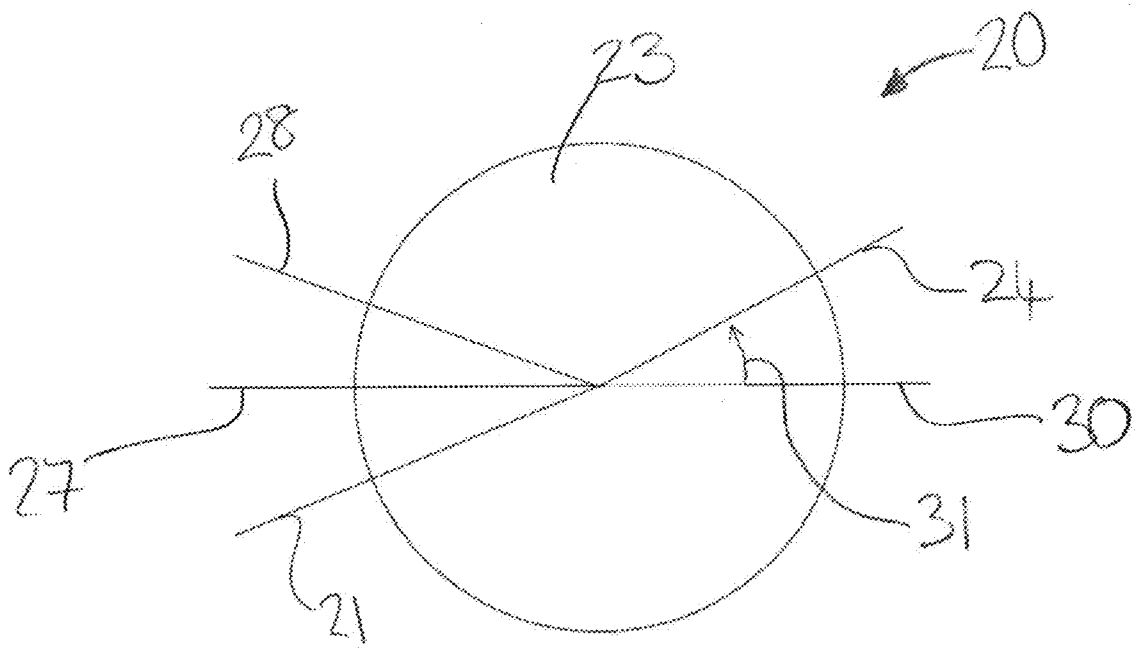
FIG. 2*a* shows a front schematic view of a controller according to a first embodiment of the invention.

FIG. 2*a* shows a front schematic view of a controller 20 according to a first embodiment of the invention.

In a similar way to the controller 10 of FIG. 1, the controller 20 has a backwards speed setting 21 and a (normal power) forward speed setting region 23. When in the forward speed setting region 23, the system provides an amount of torque to the drive system based on the position of a controller within the forward speed setting region 23. In other words, the controller 20 dictates how much torque is provided.

Also similar to FIG. 1, in the backwards speed setting 21, the amount of backwards driving torque supplied (and regenerative braking) is based on the speed of the aircraft, such that the speed is maintained to be at or near 2 knots (backwards). This enables the aircraft to be taxied at a speed similar to walking speed, without a pilot, for example, having to actively manage the backwards speed.

When the controller is moved from the backwards speed setting to a zero speed setting 27, the torque supplied is adjusted, and brakes applied, so as to slow the aircraft down to zero speed.

The controller has a maximum normal power setting 24. This is the maximum setting at which torque at that level can be continuously supplied. This is 55 kVA.

However, the controller 20 can be placed in a (forwards) boost power setting 30. In this setting, an additional torque level is available, of 18% more (65 kVA as opposed to 55 kVA). A spring (shown by arrow 31) biases the controller back to the maximum normal power setting 24.

The additional torque level is only available for a limited time, in this embodiment, for 1 minute. After that, the torque level provided is at the same level as for the maximum normal power setting 24, even if the controller is held, for example by the pilot, against the spring 31, in the boost power setting 30.

The additional power in the boost power setting is provided by the same power source that supplies the power of the normal power setting. This is from an APU (Auxiliary Power Unit) (not shown).

The additional torque can be used, temporarily, for example if the aircraft is going uphill or crossing a runway. This enables the aircraft to be effectively driven at a suitable speed, but does not generally overburden a power source of the landing gear drive system, or affect the health of the power source equipment.

There is also a (normal power) low forwards speed setting 28. In this setting, the amount of forwards driving torque supplied (by a landing gear drive system), and the amount of regenerative braking, is based on the speed of the aircraft (sensed by a sensor), such that the speed is maintained to be at or near 2 knots (forwards). This enables the aircraft to be taxied at a speed similar to walking speed, without a pilot, for example, having to actively manage the forwards speed. This makes parking the aircraft (nose in) at an aircraft gate much easier and will likely prevent damage/risk from a low speed impact occurring between an aircraft and an aircraft gate.

When the controller 20 is moved from the low forwards speed setting 28 to the zero speed setting 27, the driving torque supplied is adjusted (for example by reducing the forwards driving torque to zero, by reducing the torque supplied to the drive system or by disengaging the drive system from an aircraft wheel), and brakes may be applied, so as to slow the aircraft down to zero speed.

Hence, when the controller 20 is moved from the backwards speed setting 21 or low forwards speed setting 28 to the zero speed setting 27, the aircraft is actively slowed to have zero speed. Hence, the zero speed setting 27 always acts as a supplement to a park brake system of the aircraft.

Figure 2B:
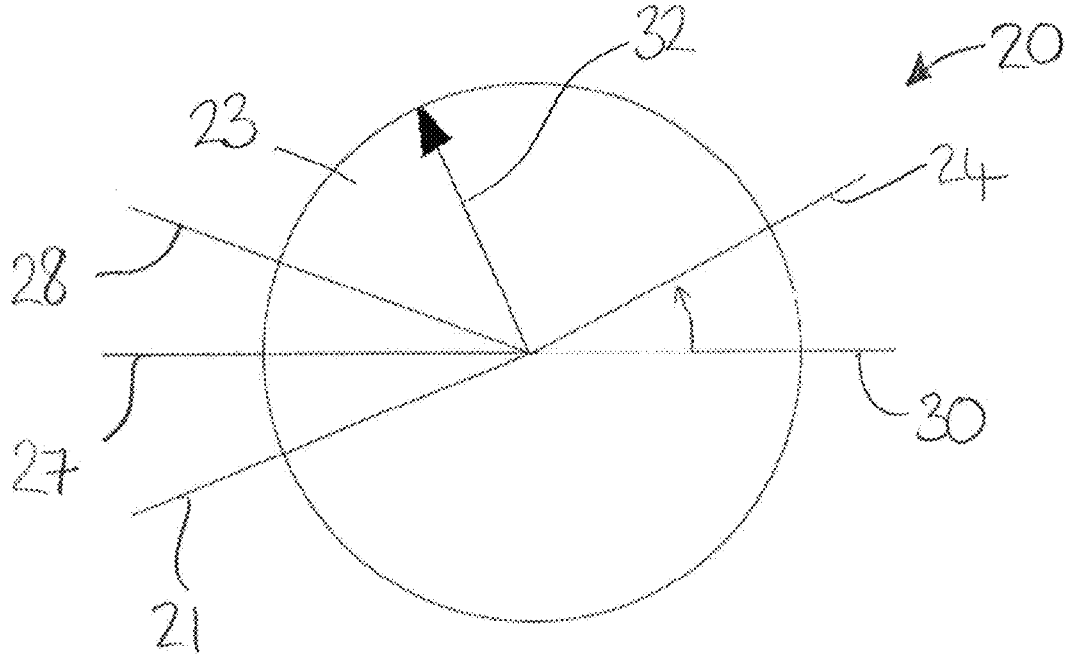
FIG. 2*b* shows a front schematic view of the controller of FIG. 2*a*, also showing a dial switch.

FIG. 2*b* shows a front schematic view of the controller 200 of FIG. 2*a*, also showing a dial switch 32.

It is this dial switch 32 that is rotated into and out of the different settings 21, 27, 28, 23, 24, 30.

Figure 3:
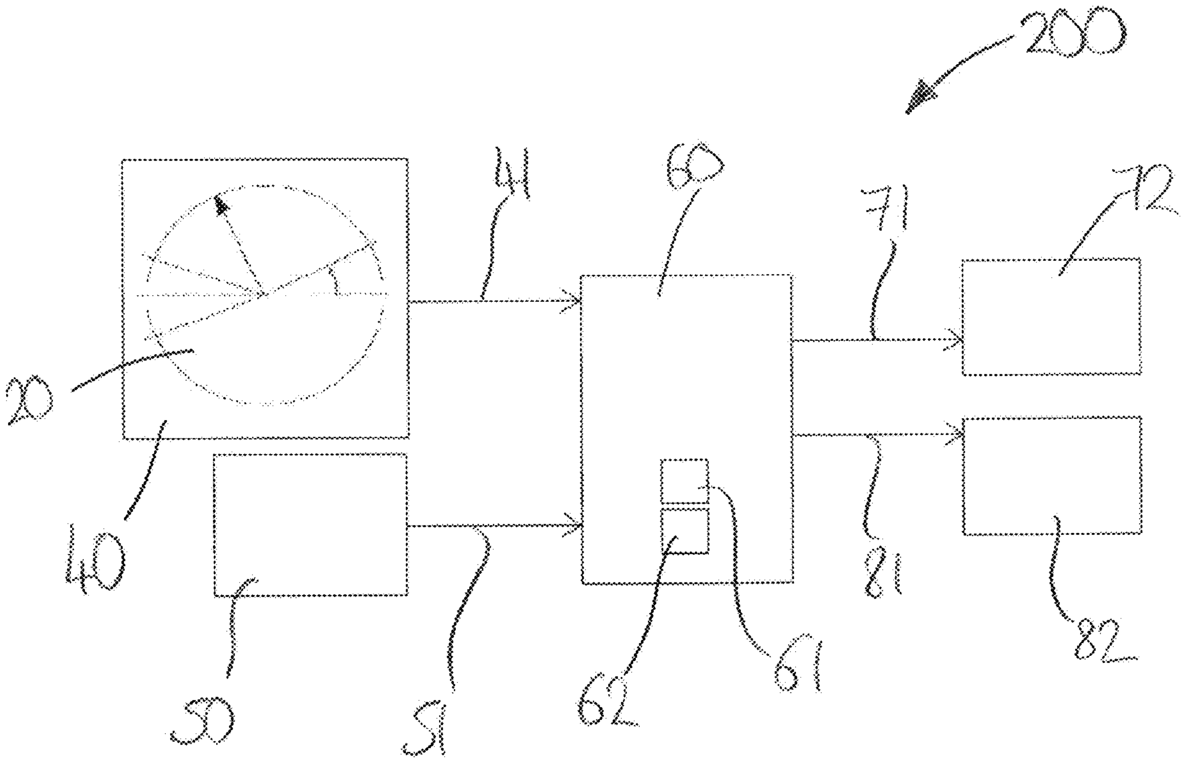
FIG. 3 shows a schematic diagram of a control system including the controller of FIGS. 2*a* and 2*b;*

FIG. 3 shows a schematic diagram of a control system 200 including the controller 20 of FIGS. 2*a* and 2*b*.

The controller 20 is part of a control panel 40. The control panel 40 has a control signal line 41 to a control unit 60. This is how the setting of the controller 20 is sent to the control unit 60.

There is also an aircraft speed sensor 50 that has a speed indication signal line 51 to the control unit 60. This is how the control unit has an indication of the aircraft taxi speed, during use.

The control unit 60 includes a computer to calculate and provide two outputs; an output command for the landing gear drive system and an output command for the friction brake system.

The output command for the drive system is provided to the drive system (represented by box 72) by the drive system command line 71. This may be a disengagement command, a re-engagement command, a regenerating braking torque command (i.e. a command for the drive system to remain engaged with no driving torque provided), a forwards driving torque command or a backwards driving torque command.

The output command for the friction brake system is provided to the brake system (represented by box 82) by the brake system command line 81. This is a braking torque command.

The drive system 72 (not shown in detail) comprises a drive system similar to as shown in GB 2528966 A. It has a drive pinion driven by a torque controlled motor and a driven gear attached to a wheel of the aircraft. The drive pinion can be selectively moved in and out of meshing engagement with the driven gear. It is this engagement that is controlled by the disengagement and re-engagement commands, for example.

The control unit 60 is provided with two sets of input values.

Firstly, a speed threshold set of values (Vt) represented by box 61. In this example, this is just one speed value. Above this threshold taxi speed value (here, 30 knots), the control unit will command the drive system to disengage the pinion gear and driven gear (disengagement command), as will be described below. Below this threshold taxi speed value, the control unit will command the drive system to remain engaged, as will be described below.

Secondly, a set of target speed values, represented by box 62. Here, these are a low forwards speed setting of 2 knots and a backwards speed setting of 2 knots. In other words, these are the desired aircraft taxi speeds in settings 28 and 21 respectively.

Figure 5:
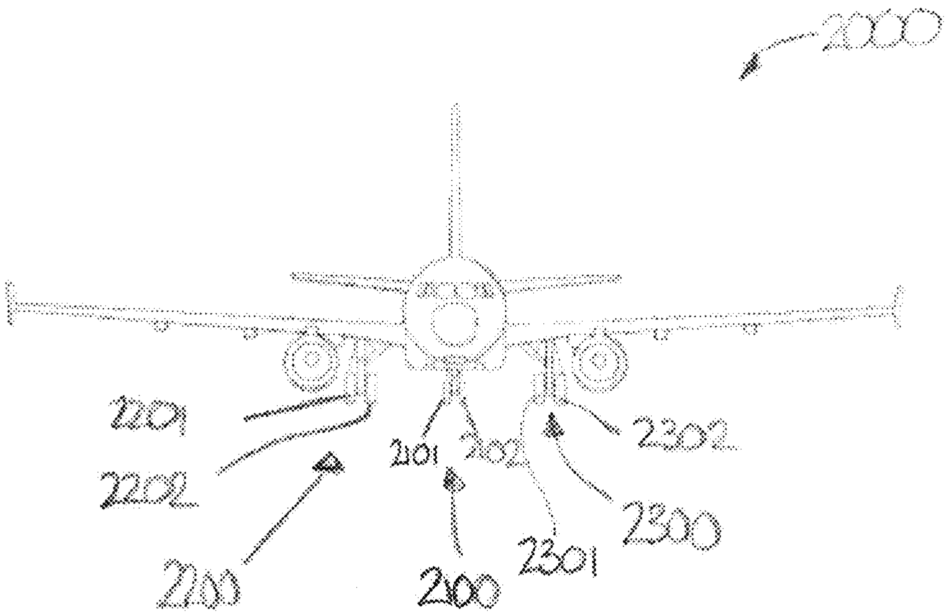
FIG. 5 shows a front view of an aircraft including the control system of FIG. 3.

FIG. 5 shows a front view of an aircraft 2000 including the control system 200 of FIG. 3.

The aircraft 2000 is provided with a nose landing gear 2100 with two wheels 2101, 2102. The aircraft also has a right hand (viewed from the forwards direction of the aircraft) landing gear 2200 with two wheels 2201, 2202. The aircraft also has a left hand landing gear 2300 with two wheels 2301, 2302.

The aircraft 2000 is also provided with the control system 200 described above (not shown in FIG. 5), a drive system 72 (not shown in FIG. 5) for driving one or more main landing gear wheels 2201, 2202, 2301, 2302 and a braking system 82 (not shown in FIG. 5).

In use, a pilot uses the controller 20 to adjust the taxi speed of the aircraft 2000, through use of the drive system 72 and brake system 82. The required commands of the drive system 72 and brake system 82 are decided by the control unit 60, based on the controller 20 setting (from signal line 41) and the aircraft taxi speed (from line 51).

For example, when the controller 20 is in the backwards speed setting 21, the control unit 60 commands the drive system 72 provide a backwards driving torque, and regenerative braking, to achieve the target speed (here, 2 knots backwards) provided in box 62. This is done as a feedback loop, based on the taxi speed detected by the aircraft speed sensor 50.

When the controller 20 is moved to the zero speed setting 27, the control unit 60 commands the drive system to stop providing a backwards driving torque. In addition, the control unit 60 will command the friction brake system 82 to apply the friction brakes to apply a braking torque to reduce the backwards speed of the aircraft to zero.

When the controller 20 is moved to the low forwards speed setting 28, the control unit 60 will command the drive system 72 to apply a forwards driving torque, and provide regenerative braking. This will be done to achieve the target speed (here, 2 knots forwards) provided in box 62. This is done as a feedback loop, based on the taxi speed detected by the aircraft speed sensor 50.

When the controller 20 is then moved into the high forwards speed region 23, the torque commanded from the drive system 72 is not related or constrained by the aircraft speed. Instead, the drive system 72 is commanded to provide a torque level corresponding to the relative position of the controller dial 32 within the region 23. For example, if the dial 32 is only just above the low speed setting 28, the torque demanded will be low (but generally enough to provide an aircraft speed of more than 2 knots). If the dial 32 is just below the maximum normal power setting 24, the torque demanded will be high (almost at the maximum normal torque available).

If the pilot wishes to increase the torque demanded further, they may actively apply pressure to the dial switch 32 against the spring 31 to hold the dial switch in the boost power setting 30. If the pilot releases the dial switch 32 it will be urged back (by the spring 31) to the maximum normal power setting 24. The boost power setting 30 is able to provide 18% more power than in the maximum normal power setting 24.

When the dial switch 32 is in the boost power setting 30, the torque demanded corresponds to the boost power setting (65 kVA).

However, if the dial switch 32 has been in the boost power setting for 1 minute (60 seconds), the torque demanded from the drive system 72 will be reduced to that of the maximum normal power level 24 by the control unit 60. This can then be re-increased after 1 minute (60 seconds) has passed.

When the controller 20 is moved from a relatively higher speed setting to a relatively lower speed setting in region 23, the control unit commands that the drive system 72 provides an appropriate lower torque, based on the position of the dial within the region 23. No friction braking command is given and so the aircraft slows naturally, or with manual braking by the pilot.

When the controller 20 is moved to the low speed setting 28, from a setting in the high forwards speed setting region 23 (or boost power setting 30), the control unit 60 commands the drive system 72 and the brake system 82 such that the aircraft reduces speed to, and then maintains the target speed, of 2 knots.

Initially, if the aircraft speed is below 3 knots, for example, the brake system 82 will be commanded to provide a braking torque to reduce the aircraft speed.

Once the aircraft speed has reduced to 2 knots, the drive system 72 provides a driving torque and a regenerative braking torque to maintain the aircraft speed at 2 knots.

If the initial aircraft speed is above 3 knots, for example, the pilot may have to actively use the brake pedals to reduce the aircraft speed to 3 knots. After this, the brake system 82 will be commanded to provide a braking torque to reduce the aircraft speed further.

When the controller 20 is moved to the zero speed setting 27 from the low forwards speed setting 28, the control unit 60 commands such that the aircraft speed reduces to zero.

The brake system 82 is commanded to provide a friction braking torque to do so.

Figure 4:
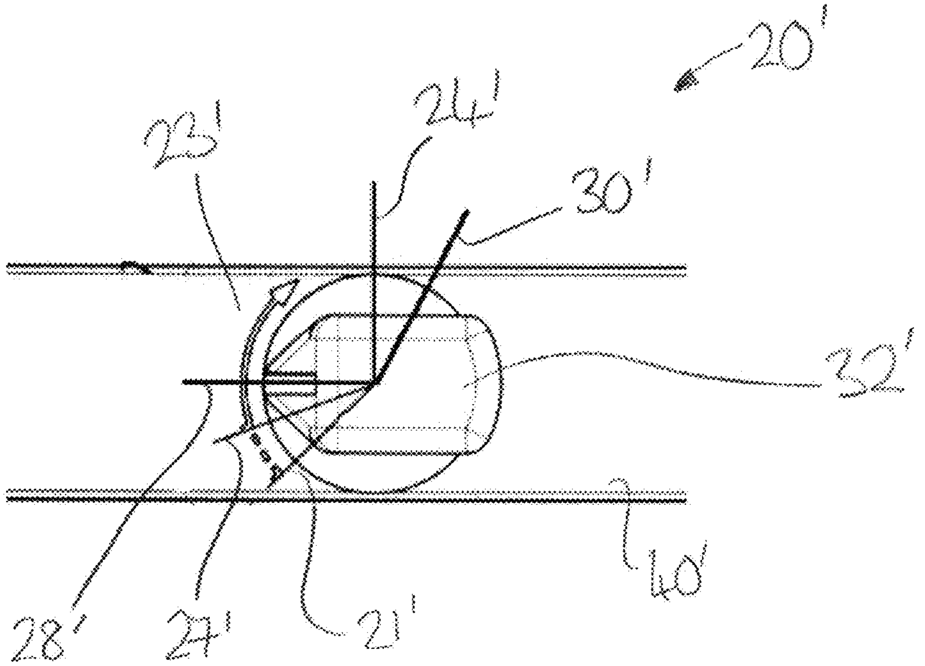
FIG. 4 shows a schematic diagram of a controller according to a second embodiment of the invention.

FIG. 4 shows a schematic diagram of a controller 20', on a control panel 40', according to a second embodiment of the invention. The controller 20', and its use, is similar to that described for controller 20. However, the differences, in relation to the setting positions, will be described.

Here, the dial switch 32' has the different settings arranged at different angles about the dial. The maximum normal power setting 24' is located at "12 o'clock" on the dial. The boost power setting 30' is located 25 degrees further round (clockwise). The low forward speed setting 28' is located at 90 degrees anti-clockwise (i.e. at "9 o'clock") from the maximum normal power setting 24'. The zero speed setting 27' is located 20 degrees further anti-clockwise (i.e. 110 degrees anti-clockwise from the maximum normal power setting 24'). Finally, the backward speed setting 21' is located 25 degrees further anti-clockwise (i.e. 135 degrees anti-clockwise from the maximum normal power setting 24').

These setting positions provide that substantially all of the forward settings are in a forward facing position (i.e. between "9 o'clock" and "3 o'clock" on the dial) and that, for most scenarios, moving to a greater forward speed (e.g. within the region 23') involves movement of the dial to a more forward position (i.e. moving from 9 o'clock" to 12 o'clock").

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The reduction of torque level to that of the maximum normal power setting 24 may occur after a different length of time, for example 30 seconds or 90 seconds. The reduction may instead occur when a certain amount of additional torque has been employed.

The re-increase of torque level to that of the boost power setting 30 may occur after a different length of time, for example 30 seconds or 90 seconds. The re-increase may instead occur when a certain amount of reduction is torque has been achieved. For example, it may be equivalent to when the torque provided has been at a mid-power level (half way in region 23) for 30 seconds or at the maximum power level 24 for 1 minute.

The re-increase and/or cutting off of boost power level may be based on the overall power consumption/demand of the drive system over a period of time, for example, the previous 2 or 3 minutes.

The additional torque level associated with the boost power setting 30 may instead be provided by a different power source from that which supplies the power of the normal power setting. For example, this may be by a battery, if the normal torque is provided by an APU.

The normal torque level may be provided by one or more power sources, other than an APU, for example a battery. Here, if the additional torque level is provided by a different power source, it may be from an APU.

When the controller 20 is moved so as to reduce the aircraft speed (i.e. from a forwards speed setting to a lower speed setting or the zero speed setting 27), a regenerative braking torque may be provided by the landing gear drive system so as to slow the aircraft down to zero speed, or a braking torque from a brake system of the aircraft may be provided, or both.

Different braking methods may be employed at different aircraft speeds. For example, at a low speed (e.g. under 2 knots) friction braking and regenerative braking may be commanded.

The speed threshold(s) may be any suitable, appropriate speed, chosen to prevent appropriate damage to the drive system. They may be variable, provided to the control unit 60 by a further input.

The target speed values (low forwards speed setting and backwards speed setting) may be any suitable, appropriate speed, for example 1 knot, 1.5 knots, 2.5 knots, 3 knots etc. They may be variable, provided to the control unit 60 by a further input.

The brake system of the aircraft may also or instead of friction brakes, include other braking means.

Any suitable drive system may be used.

The drive system may drive any number of wheels of the aircraft, including one or more of nose or main landing gear wheels.

Any suitable controller may be used. If a dial switch 32 like described here is used, any suitable angles may be used for the different settings.

The control system 200 may not include the brake system and instead, the pilot may command the brake system directly from brake pedals, or other controls, in the cockpit, for example.

As a further alternative, the command to the brake system 82 may come via the drive system 72 (i.e. not directly from the control unit 60).

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, “or” should be interpreted as “and/or”.

The invention claimed is:

1. A control system for controlling a landing gear drive system on an aircraft, the drive system being capable of driving rotation of a wheel of the aircraft, the control system comprising a control panel, provided with a controller, the controller having a switch comprising
a backwards motion setting,
a zero speed setting, and
a forward motion setting, a control unit for receiving a control input from the controller, and for providing a torque command to be applied to the wheel, and a speed sensor for sensing an aircraft taxi speed and for providing an indication of the aircraft taxi speed to the control unit, wherein the control unit is arranged such that, when the switch is in the backwards motion setting:

the control unit provides a backwards driving torque command to the drive system, based on the indication of the aircraft taxi speed, to maintain the backwards aircraft taxi speed at or near a desired speed, and as a direct consequence of the pilot moving the switch from the backwards motion setting to the zero speed setting:

the control unit automatically provides a torque command to the drive system to provide zero backwards driving torque to the wheel, and the control unit provides a braking command to apply a braking torque to the wheel to slow rotation of the wheel while the aircraft taxi speed is above zero, when the switch is moved from the forward motion setting to the zero speed setting:

the control unit provides a torque command to the drive system to provide zero forwards driving torque to the wheel, and the control unit provides a braking command to apply a braking torque to the wheel to slow rotation of the wheel while the aircraft taxi speed is above zero.

2. The control system according to claim 1, wherein the controller has a single backwards motion setting, corresponding to a desired speed.

3. The control system as claimed in claim 1, wherein the drive system comprises a pinion gear driveable by a motor, the pinion gear being arrangeable to drive rotation of the wheel, and wherein the torque command to provide zero backwards driving torque to the wheel includes a command to reduce the backwards driving torque provided by the motor to the pinion gear to zero.

4. The control system as claimed in claim 1, wherein the braking command to apply a braking torque to the wheel to slow rotation of the wheel includes a command to a braking system of the aircraft to apply a braking torque to the wheel.

5. The control system as claimed in claim 1, wherein the braking command to apply a braking torque to the wheel to slow rotation of the wheel includes a command to the drive system of the aircraft to apply a braking torque to the wheel, wherein the drive system is commanded to provide a regenerative braking torque.

6. The control system as claimed in claim 1, wherein the braking system is a friction braking system.

7. The control system as claimed in claim 1, wherein the desired speed is within the range between 1 and 3 knots.

8. An aircraft comprising an aircraft landing gear, having at least one wheel provided with a drive system for driving rotation of the wheel, the drive system comprising a motor, wherein the aircraft also comprises the control system of claim 1, the control system being arranged to control the drive system.

9. The control system as claimed in claim 1, wherein the command to the drive system of the aircraft of the aircraft to apply a braking torque to the wheel is given when the indication of the aircraft taxi speed is within the range between 1 and 3 knots.

10. A method of controlling an aircraft landing gear drive system capable of driving rotation of a wheel of an aircraft, the method comprising the step of using the control system of claim 1.

11. A method of controlling an aircraft landing gear drive system capable of driving rotation of a wheel of an aircraft, the method comprising the step of using the control system of claim 1.

12. A method of controlling an aircraft landing gear drive system capable of driving rotation of a wheel of an aircraft, the method comprising the steps of:

as a direct consequence of the pilot moving a switch of a controller of a control panel from a forward motion setting to a zero speed setting, and providing a control input from the switch to a control unit, the control unit automatically providing a torque command to the drive system to provide zero forwards driving torque to the wheel, and the control unit providing a braking command to apply a braking torque to the wheel to slow rotation of the wheel while the aircraft taxi speed is above zero, the method further comprising the steps of:

positioning the switch in a backwards motion setting, and providing a control input from the switch to the control unit, and when the switch is in the backwards motion setting, the control unit providing a backwards driving torque command to the drive system, based on an indication of an aircraft taxi speed such that the backwards aircraft taxi speed is maintained at or near a desired speed, and as a direct consequence of the pilot moving the switch of the controller from the backwards motion setting to the zero speed setting, the control unit automatically providing a torque command to the drive system to provide zero backwards driving torque to the wheel, and the control unit providing a braking command to apply a braking torque to the wheel to slow rotation of the wheel while the aircraft taxi speed is above zero.

13. The method as claimed in claim 12, wherein the controller has a single backwards motion setting, corresponding to the desired speed.

14. The method as claimed in claim 12, wherein the drive system comprises a pinion gear driveable by a motor, the pinion gear being arrangeable to drive rotation of the wheel, and wherein the torque command to provide zero backwards driving torque to the wheel includes a command to reduce the backwards driving torque provided by the motor to the pinion gear to zero.

15. The method as claimed in claim 12, wherein the braking command to apply a braking torque to the wheel to slow rotation of the wheel includes a command to a braking system of the aircraft to apply a braking torque to the wheel.

16. The method as claimed in claim 12, wherein the braking command to apply a braking torque to the wheel to slow rotation of the wheel includes a command to the drive system of the aircraft to apply a braking torque to the wheel, wherein the drive system is commanded to provide a regenerative braking torque.

17. The method as claimed in claim 12, wherein the desired speed is within the range between 1 and 3 knots.

* * * * *